(12) United States Patent
Shen et al.

(10) Patent No.: US 10,566,897 B2
(45) Date of Patent: Feb. 18, 2020

(54) DC CONVERTER, DC CONVERTER GROUP AND METHOD OF CONNECTING THE SAME

(71) Applicant: Delta Electronics, Inc., Taoyuan, Taiwan (CN)

(72) Inventors: Guoqiao Shen, Taoyuan (CN); Yuhu Zhou, Taoyuan (CN); Haijun Yang, Taoyuan (CN); Jinfa Zhang, Taoyuan (CN)

(73) Assignee: Delta Electronics, Inc., Taoyuan, Taiwan (CN)

( * ) Notice: Subject to any disclaimer, the term of this patent is extended or adjusted under 35 U.S.C. 154(b) by 0 days.

(21) Appl. No.: 16/266,007

(22) Filed: Feb. 2, 2019

(65) Prior Publication Data

US 2019/0305672 A1   Oct. 3, 2019

(30) Foreign Application Priority Data

Mar. 29, 2018   (CN) .......................... 2018 1 0270141

(51) Int. Cl.
*H02M 1/44* (2007.01)
*H02M 3/04* (2006.01)
(Continued)

(52) U.S. Cl.
CPC ............... *H02M 1/44* (2013.01); *H02M 1/14* (2013.01); *H02M 3/04* (2013.01); *H02M 3/1584* (2013.01); *H02M 2001/123* (2013.01)

(58) Field of Classification Search
CPC ............ H02M 1/44; H02M 3/04; H02M 7/42; H02M 7/44; H02M 7/53; H02M 7/537; H02M 7/515
See application file for complete search history.

(56) References Cited

U.S. PATENT DOCUMENTS

2008/0080106 A1   4/2008 Mirafzal et al.
2009/0091952 A1*  4/2009 Yoshida .................. H02M 1/15
                                                   363/21.12
(Continued)

FOREIGN PATENT DOCUMENTS

CN      203119759 U    8/2013
CN      104700988 A    6/2015
(Continued)

OTHER PUBLICATIONS

Deng Cheng et al: "PFC converter with novel integration of both EMI filter and Boost inductors",2013 IEEE Energy Conversion Congress Ano Exposition,IEEE, Sep. 15, 2013 (Sep. 15, 2013), pp. 3390-3397, XP032516607,DOI: 10.11 09/ECCE.2013.6647146 [retrieved on Oct. 24, 2013].

(Continued)

*Primary Examiner* — Adolf D Berhane
(74) *Attorney, Agent, or Firm* — Yunling Ren (57) ABSTRACT

The present disclosure relates to a DC converter, a DC converter group and a method of connecting the DC converter group. The DC converter includes a DC conversion circuit converting a DC input voltage into a DC output voltage, and a filter module electrically coupled to an input end and an output end of the DC conversion circuit. The filter module includes an input inductor component electrically coupled to the input end of the DC conversion circuit, and an output inductor component electrically coupled to the output end of the DC conversion circuit, wherein the input inductor component and the output inductor component share the same magnetic core.

20 Claims, 11 Drawing Sheets

(51) Int. Cl.
*H02M 3/158* (2006.01)
*H02M 1/14* (2006.01)
*H02M 1/12* (2006.01)

(56) References Cited

U.S. PATENT DOCUMENTS

| | | | | |
|---|---|---|---|---|
| 2011/0292703 A1* | 12/2011 | Cuk | ............... | H02M 1/4258 363/126 |
| 2014/0211521 A1* | 7/2014 | Mazumder | ............. | H02M 7/48 363/40 |
| 2018/0164362 A1* | 6/2018 | Premerlani | ........ | G01R 19/0092 |

FOREIGN PATENT DOCUMENTS

| | | |
|---|---|---|
| EP | 0444428 A | 9/1991 |
| EP | 2357727 A1 | 8/2011 |
| EP | 2782237 A1 | 9/2014 |
| JP | 2005130575 A | 5/2005 |

OTHER PUBLICATIONS

The EESR issued Aug. 29,2019 by the EP Office.

* cited by examiner (Prior art)
Fig. 1

(Prior art)

Fig. 11

DC CONVERTER, DC CONVERTER GROUP AND METHOD OF CONNECTING THE SAME

CROSS-REFERENCE TO RELATED APPLICATIONS

This application is based upon and claims priority to Chinese Patent Application No. 201810270141.3, filed on Mar. 29, 2018, the entire content of which is hereby incorporated by reference for all purpose.

TECHNICAL FIELD

The present disclosure relates to the field of direct current (DC) power distribution, and particularly to a DC converter, a DC converter group and a method of connecting the DC converter group.

BACKGROUND

DC (DC/DC) converters are widely used in electrified railway transportation, electrical power system, renewable energy generation, energy storage system, high-power transmission, and the like fields. Especially in the field of high-power applications, in order to increase power capacity or meet requirements of high-current operation of a system, modular parallel connection of DC converters has become a development trend.

EMI (Electro-magnetic interference) filters used to suppress electromagnetic interference in DC converters play an important role in product performance, cost and operational reliability. Conventional DC converters are equipped with EMI filters at input and output sides of the circuit topology respectively. However, such configuration has troubles in design or application for some DC converters, such as the current circulation problem in multiple modules in the parallel application and magnetic saturation risk of EMI common mode inductors.

Therefore, it is necessary to improve EMI filters design in DC-DC converters.

SUMMARY

According to an aspect of the present disclosure, a DC converter is provided, which includes: a DC conversion circuit, configured to convert a DC input voltage into a DC output voltage; and a filter module, electrically coupled to an input end and an output end of the DC conversion circuit, wherein the filter module includes: an input inductor component, electrically coupled to the input end of the DC conversion circuit; and an output inductor component, electrically coupled to the output end of the DC conversion circuit, wherein the input inductor component and the output inductor component share the same magnetic core.

According to another aspect of the present disclosure, a DC converter group is provided, which includes: DC converters according to the above aspect; a DC input unit, electrically coupled to an input end of each of the DC converters; and a DC output unit, electrically coupled to an output end of each of the DC converters.

According to still another aspect of the present disclosure, a method of connecting a DC converter group, for electrically coupling DC converters according to the above aspect to a DC input unit and a DC output unit, is provided, which includes: electrically coupling an input end of each of the DC converters to the DC input unit; and electrically coupling an output end of each of the DC converters to the DC output unit.

BRIEF DESCRIPTION OF THE DRAWINGS

The above and other features and advantages of the present disclosure will become more apparent by describing exemplary embodiments thereof with reference to accompanying figures.

DETAILED DESCRIPTION

Example embodiments will now be described more fully with reference to the accompanying drawings. However, the exemplary embodiments can be embodied in a variety of forms and should not be construed as being limited to the embodiments set forth herein. Rather, these embodiments are provided so that the present disclosure will be thorough and complete and the concepts of the example embodiments are fully conveyed to those skilled in the art. The same reference numerals in the drawings denote the same or similar parts, and the repeated description thereof will be omitted.

The flowcharts shown in the figures are merely illustrative, and it is not necessary to include all of the content and operations/steps, and it is not necessary to be performed only according to the order as described. For example, some operations/steps may be decomposed, and some operations/steps may be merged or partially merged, so the actual execution order may vary depending on actual situations.

Figure 1:
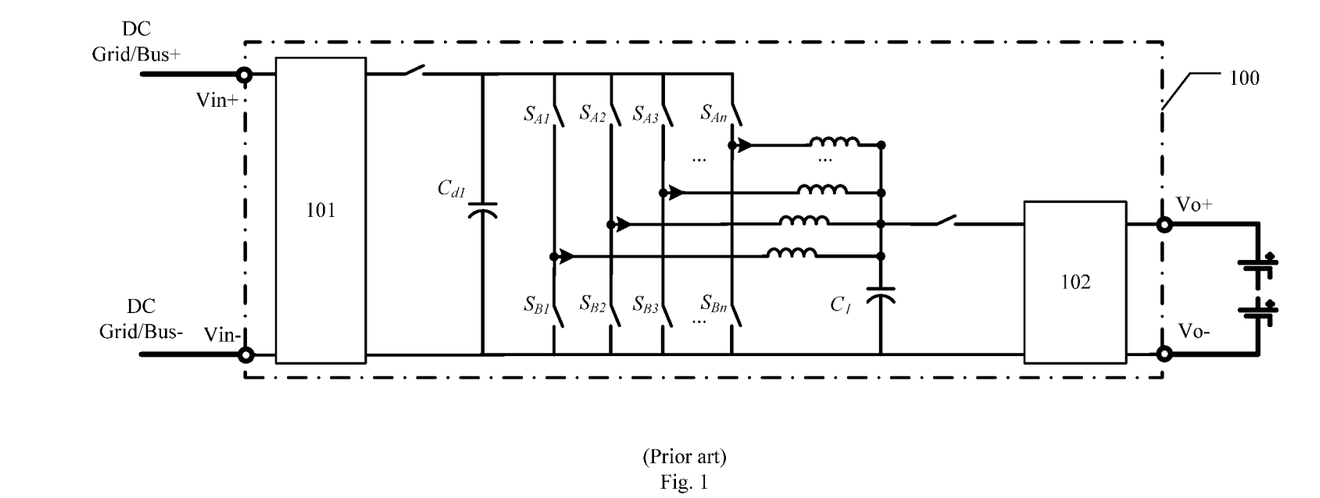
FIG. 1 is a schematic diagram of a circuit topology of a DC converter having a separate EMI filter in prior art.

FIG. 1 shows a circuit topology of a DC converter having a separate EMI filter in prior art. The DC converter 100 includes a DC conversion circuit, an input EMI filter 101 and an output EMI filter 102. The input EMI filter 101 is electrically coupled between input terminals of the DC converter 100 and input terminals of the DC conversion circuit. An input positive terminal Vin+ and an input negative terminal Vin− of the DC converter 100 are connected to a positive DC bus Bus+ and a negative DC bus Bus− of a DC grid, respectively. The output EMI filter 102 is electrically coupled between output terminals of the DC converter 100 and output terminals of the DC conversion circuit. An output positive terminal Vo+ and an output negative terminal Vo− of the DC converter 100 are connected to a positive electrode and a negative electrode of a load (for example, a battery or a battery pack), respectively.

The input EMI filter 101 is for suppressing interference of power signals received from the input end of the DC converter 100 to the DC conversion circuit. The output EMI filter 102 is for suppressing interference of output signals of the DC conversion circuit to loads connected to the output end of the DC converter 100. However, the presence of the input EMI filter 101 and the output EMI filter 102 increases components of the DC converter 100, resulting in high cost and large space occupancy.

The EMI filters 101 and 102 are used for suppressing high frequency noise. For low frequency noise, it is straight-through between the input negative terminal and the output negative terminal inside the DC converter 100, which is called that the input end and the output end share a common negative electrode. At this time, a voltage of the input negative terminal and a voltage of the output negative terminal of the DC converter 100 are the same, that is, a voltage drop of the negative electrode line is zero.

Figure 2:
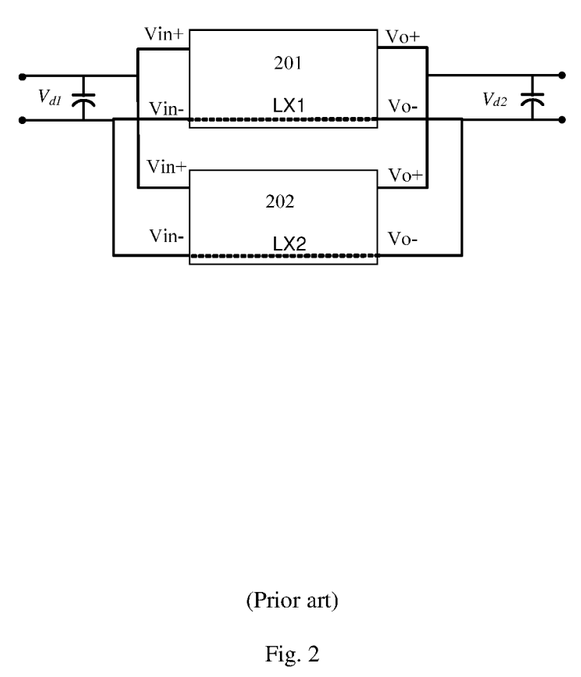
FIG. 2 is a schematic block diagram showing a circuit structure of a parallel group of the DC converter shown in FIG. 1 in prior art.

When a plurality of DC converters having dual EMI filters as shown in FIG. 1 form a parallel group of the DC converter in a parallel manner as shown in FIG. 2, the input negative terminal Vin− of the DC converter 201 is connected to the input negative terminal Vin− of the DC converter 202, and the output negative terminal Vo− of the DC converter 201 is connected to the output negative terminal Vo− of the DC converter 202, that is, a negative electrode line LX1 of the DC converter 201 is connected in parallel with a negative electrode line LX2 of the DC converter 202, so terminal voltages across the LX1 and LX2, i.e., voltage drops of the negative lines of the DC converters 201 and 202 are the same. At this time, the distribution of the negative line currents is affected by the line resistances of respective paralleled branches. The line resistances include cable resistances inside and outside the DC converter and the contact resistances of port connection points. The negative line currents between the input negative terminal Vin− and the output negative terminal Vo− of each DC converter is not controlled by the DC converter itself, so there is a phenomenon of unbalanced current, and when it is too severe, it may trigger local overcurrent protection or damage the DC converter.

Further, the unbalance of negative line currents of a plurality of paralleled DC converters cause an unbalance between positive electrode current and negative electrode current of the input end or output end of each DC converter, such that the DC bias current or low frequency bias current of the common mode inductor of the input EMI filter or the output EMI filter is too large, due to which magnetic saturation occurs, so that the common mode inductor loses the filtering and anti-interference effect. In addition, for the DC converter 100 shown in FIG. 1, the input negative terminal and the output negative terminal ought not be shorted outside the DC converter. If they are shorted, the ability of the filter to suppress common mode interference will be greatly impaired.

Figure 3:
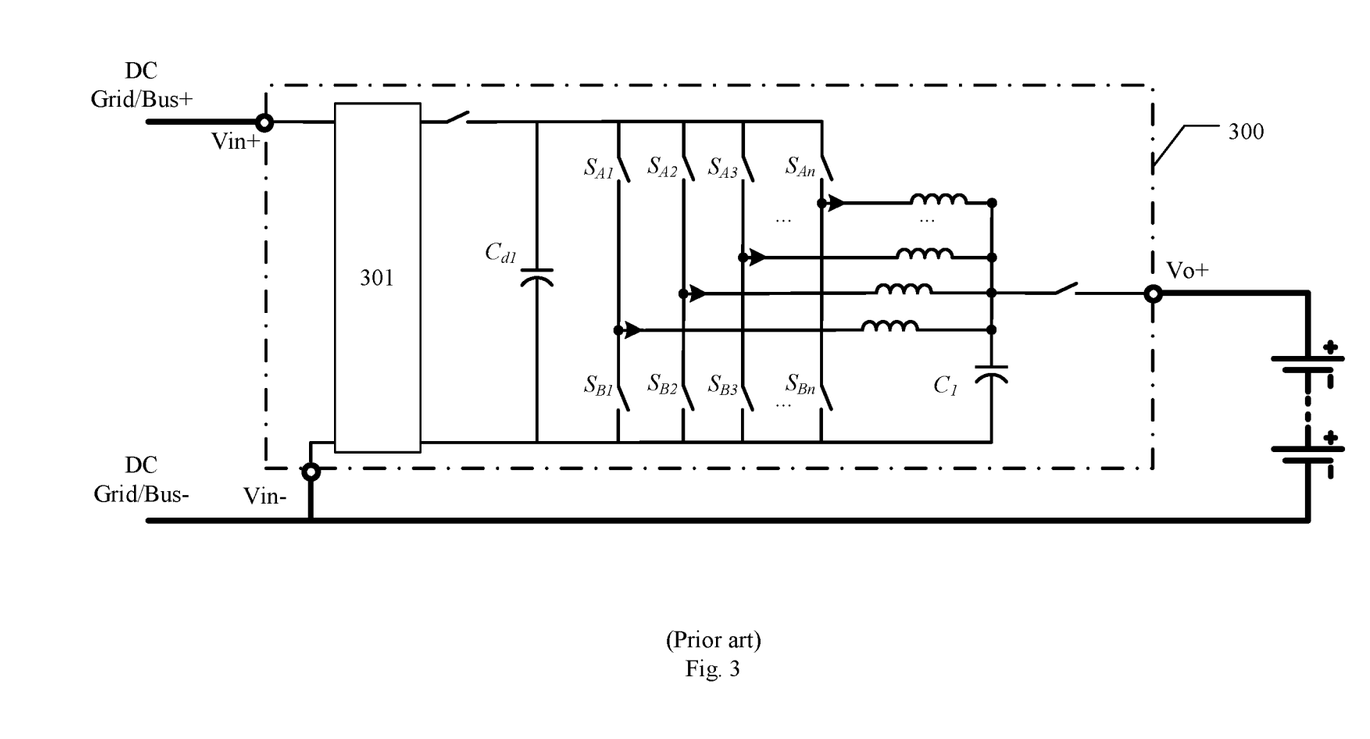
FIG. 3 is a schematic diagram showing a circuit topology of a DC converter having a common single-point connection of negative electrodes in prior art.

The DC converter 300 having a common single-point connection of negative electrodes in prior art as shown in FIG. 3 can overcome the problem of current unbalance among the paralleled converters, wherein the input negative terminal Vin− is directly connected to the output negative electrode Vo− without passing the DC converter 300, an EMI filter 301 is provided preceding to the DC conversion circuit and between the input positive terminal Vin+ and the input negative terminal Vin−, and the output of the DC converter 300 is only connected to the output positive terminal Vo+, which is equivalent to only filtering signals of the input end but not filtering signals of the output end. However, there is further a DC bias problem in the common mode inductor design of the dual port EMI filter 301, that is, the positive and negative electrode currents are unbalanced, which greatly increases difficulty of design and cost of the common mode filter inductor.

Therefore, an improved DC converter, a DC converter group and a method of connecting the DC converter group according to embodiments of the present disclosure will be described in detail below.

Figure 4:
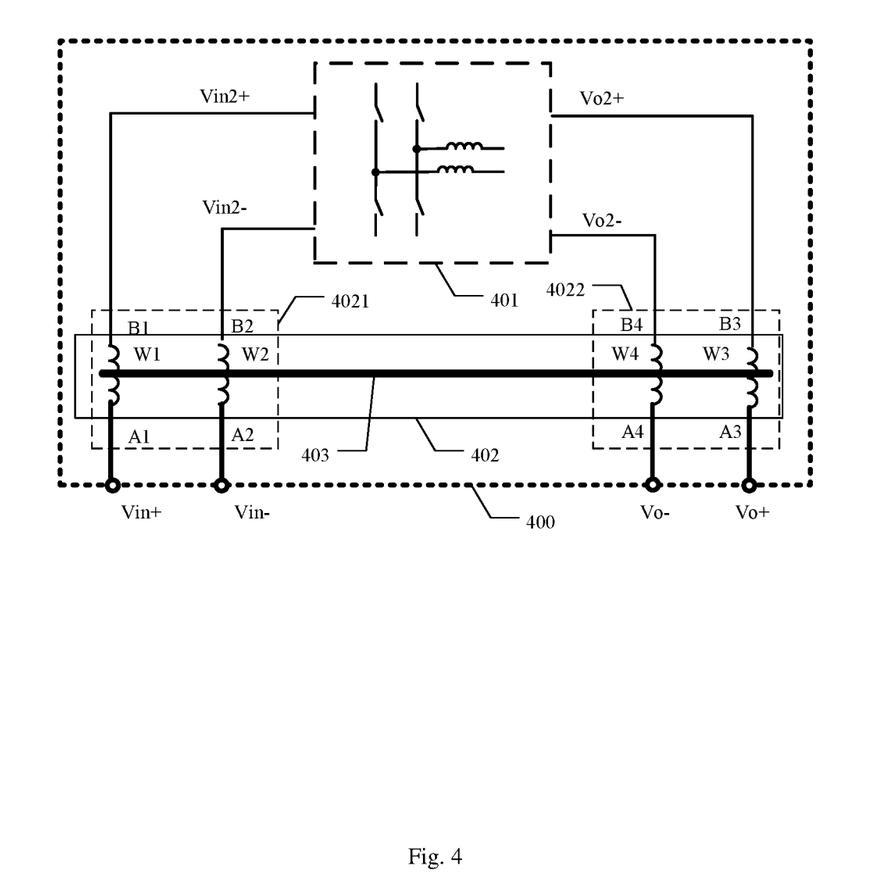
FIG. 4 is a schematic diagram of a circuit topology of a DC converter having a filter module according to an embodiment of the present disclosure.

FIG. 4 is a circuit topology of a DC converter having a filter module according to an embodiment of the present disclosure. An input end of the DC converter 400 is electrically coupled to a DC input unit (see FIG. 7), and an output end of the DC converter 400 is electrically coupled to a DC output unit (see FIG. 7). One or more DC conversion circuits 401 and a filter module 402 are included inside the DC converter 400. The DC conversion circuit 401 may be, for example, a switching conversion circuit mainly composed of (controlled) switching devices for converting a DC input voltage into a DC output voltage. The filter module 402 includes an input inductor component 4021 and an output inductor component 4022. The input inductor component 4021 is electrically coupled to the input end of the DC conversion circuit 401, and the output inductor component 4022 is electrically coupled to the output end of the DC conversion circuit 401. Specifically, the input inductor component 4021 includes a first winding W1 and a second winding W2, and the output inductor component 4022 includes a third winding W3 and a fourth winding W4. The first winding W1 is connected in series between the input positive terminal Vin+ of the DC converter 400 and the input positive terminal Vin2+ of the DC conversion circuit 401, and the second winding W2 is connected in series between the input negative terminal Vin− of the DC converter 400 and the input negative terminal Vin2− of the DC conversion circuit 401. Similarly, the third winding W3 is connected in series between the output positive terminal Vo+ of the DC converter 400 and the output positive terminal Vo2+ of the DC conversion circuit 401, and the fourth winding W4 is connected in series between the output negative terminal Vo− of the DC converter 400 and the output negative terminal Vo2− of the DC conversion circuit 401. The input inductor component 4021 and the output inductor component 4022, that is, the windings W1 to W4, share the same magnetic core 403, to form a filter module 402, which is referred to as a full-port EMI filter inductor. The filter module 402 may further be considered as one filter inductor having four windings.

According to an embodiment of the present disclosure, the windings W1 to W4 generally have the same number of turns, the wire diameter of which is determined according to the current and heat balance requirements of respective windings. Usually, the windings W1 to W4 use the same number of turns, to ensure that they have the same inductance. Except for leakage current to ground, no matter how currents in the input and output circuits of the DC converter 400 are distributed, the total amount of excitation generated on the filter module 402 is always zero, so no DC bias phenomenon exists. Respective windings W1 to W4 are wound on the magnetic core 403 in the same winding direction (for example, a direction from An to Bn, where n is 1-4).

From the viewpoint of the common mode inductor and differential mode inductor, it is the common mode inductor that mainly exists between the windings W1 to W4. The magnetic leakage between the windings form the differential mode inductor, but much smaller than the common mode inductor. Therefore, the main focus of this application is the common mode inductor of the filter module 402, which addresses common mode interference, that is, the filter module 402 suppresses the common mode interference of the DC converter 400. Further, the leakage inductance of the filter module 402 serves as the differential mode inductor to suppress the differential mode interference generated by the DC conversion circuit 401. At the same time, the effects of external common mode and differential mode interference on the DC converter 400 may be suppressed by the filter module 402. Compared with the conventional DC converter, the filter module 402 (full-port EMI filter inductor) of the embodiment of the present disclosure may realize, only by using a single filter module, interference suppression on two directions between the DC input unit and the input end of the DC conversion circuit and two directions between the DC output unit and the output end of the DC conversion circuit. Therefore, the filter module 402 has a simple structure and a small number of components, which makes the cost low and occupies small space.

According to an embodiment of the present disclosure, filter capacitors of different capacities may be bridged between dotted terminals or non-dotted terminals of the above windings W1 to W4 (for example, between any two of A1 to A4, between any two of B1 to B4), or between respective terminals and ground (for example, between An and ground, or between Bn and ground). The filter capacitor together with the windings in the filter module 402 can form differential mode and common mode filters with different frequency characteristics, to improve the electromagnetic interference suppression capability between the DC converter 400 and the external lines.

According to the embodiment of the present disclosure, in order to improve the anti-interference performance of the filter modules 402, the filter modules 402 may be cascade-connected, that is, the DC converter 400 may include at least two filter modules to further enhance the anti-interference suppression performance between the DC converter 400 and the external lines. The input inductor component and the output inductor component of each filter module are respectively connected in series with the input inductor component and the output inductor component of another filter module. For example, the first winding W1 of the first filter module is connected in series with the first winding W1 of the second filter module, the second winding W2 of the first filter module is connected in series with the second winding W2 of the second filter module, the third winding W3 of the first filter component is connected in series with the third winding W3 of the second filter module, and the fourth winding W4 of the first filter module is connected in series with the fourth winding W4 of the second filter module.

Figure 5:
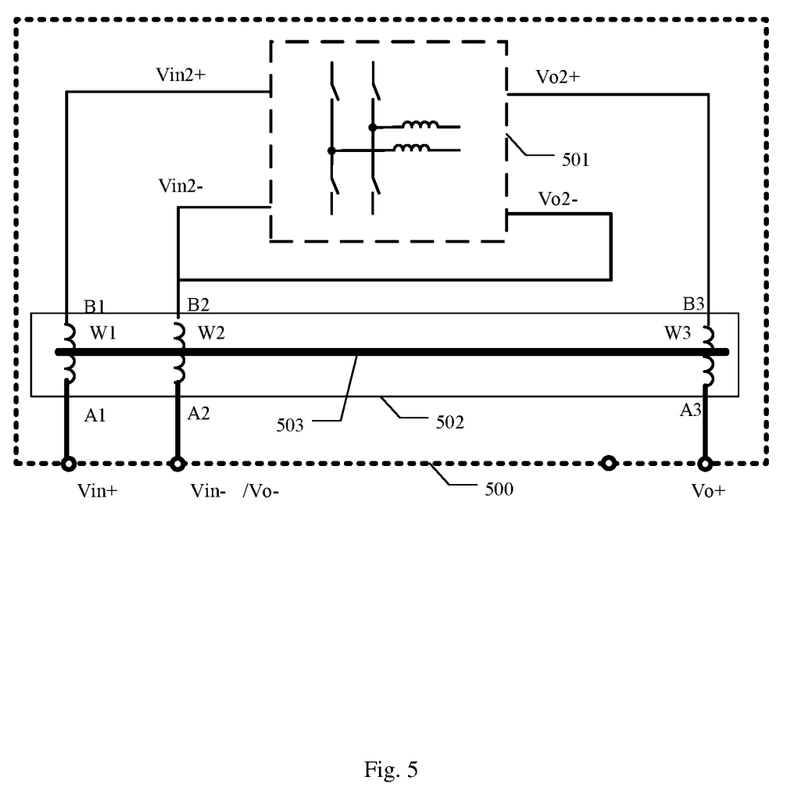
FIG. 5 is a schematic diagram of a circuit topology of a DC converter having a filter module according to another embodiment of the present disclosure.

FIG. 5 illustrates a circuit topology of a DC converter having a filter module according to another embodiment of the present disclosure. The DC converter 500 has a common negative electrode, that is, an input negative terminal Vin− and an output negative terminal Vo− are connected and share the same connection junction, which is called a common negative electrode terminal with respect to the outside. At this time, the windings connected to the input negative terminal Vin− and the output negative terminal Vo− of the DC converter 500 in the filter module 502 may be merged into one common second winding W2. The second winding W2 is connected to the input negative terminal Vin2− and the output negative terminal Vo2− of the DC conversion circuit 501, respectively. Parts in FIG. 5 that are similar to those in the circuit topology shown in FIG. 4 will not be described again.

When the cascade connection of the filter module 502 is formed by using the DC converter 500 having the common negative electrode terminal with respect to the outside shown in FIG. 5, the first winding W1 of the first filter module is connected in series with the first winding W1 of the second filter module, the second winding W2 of the first filter module is connected in series with the second winding W2 of the second filter module, and the third winding W3 of the first filter module is connected in series with the third winding W3 of the second filter module.

Figure 6:
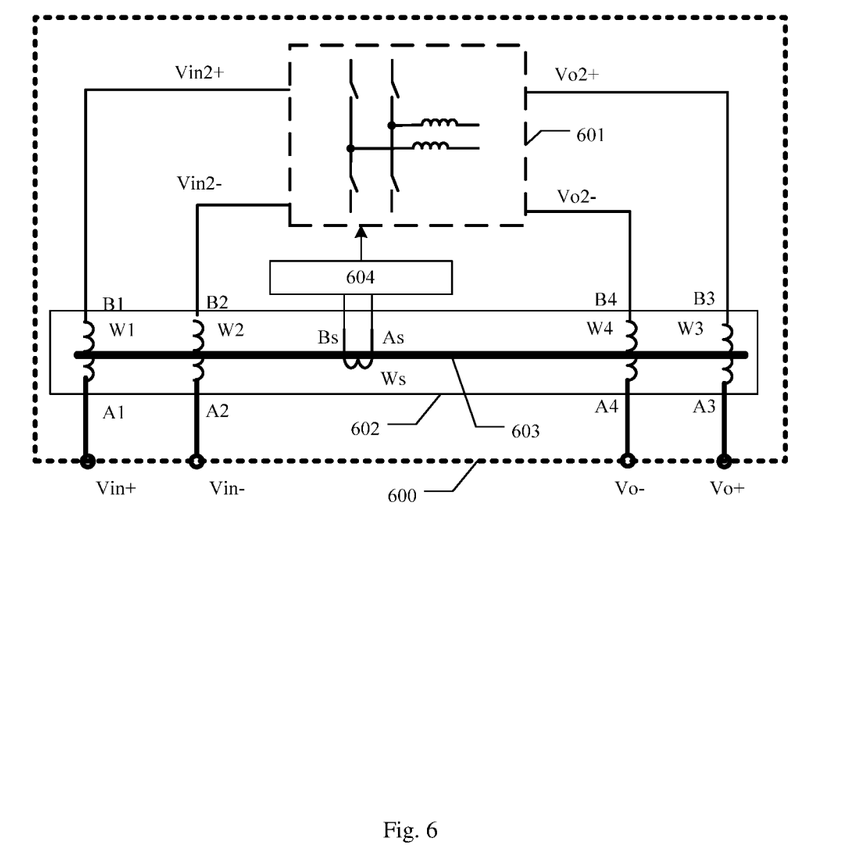
FIG. 6 is a schematic diagram of a circuit topology of a DC converter having a detecting winding according to an embodiment of the present disclosure.

FIG. 6 illustrates a circuit topology of a DC converter having a detecting winding according to another embodiment of the present disclosure. Compared with the DC converter 400 having the full-port EMI module shown in FIG. 4, in the DC converter 600, a detecting winding Ws is added on the shared magnetic core 603 of the filter module 602, as a detecting component for detecting a leakage current to ground of the DC conversion circuit 601 between the input end and the output end. The winding direction from As to Bs of the detecting winding Ws is the same as that of the first winding W1 to the fourth winding W4. The ratio of the number of turns of the detecting winding Ws to the number of turns of W1 to W4 are determined by a ratio of a common mode current measuring range of the filter module 602 to a required signal current. The detecting winding Ws is monitored by a corresponding control circuit 604. In some embodiments, a control circuit of the DC converter 600 for controlling the DC conversion circuit 601 may at the same time have a function of monitoring the detecting winding Ws. Detected signals obtained by the detecting winding Ws are sent to the control circuit 604, which controls operation modes of the DC conversion circuit 601 based on the detected signal.

Figure 7:
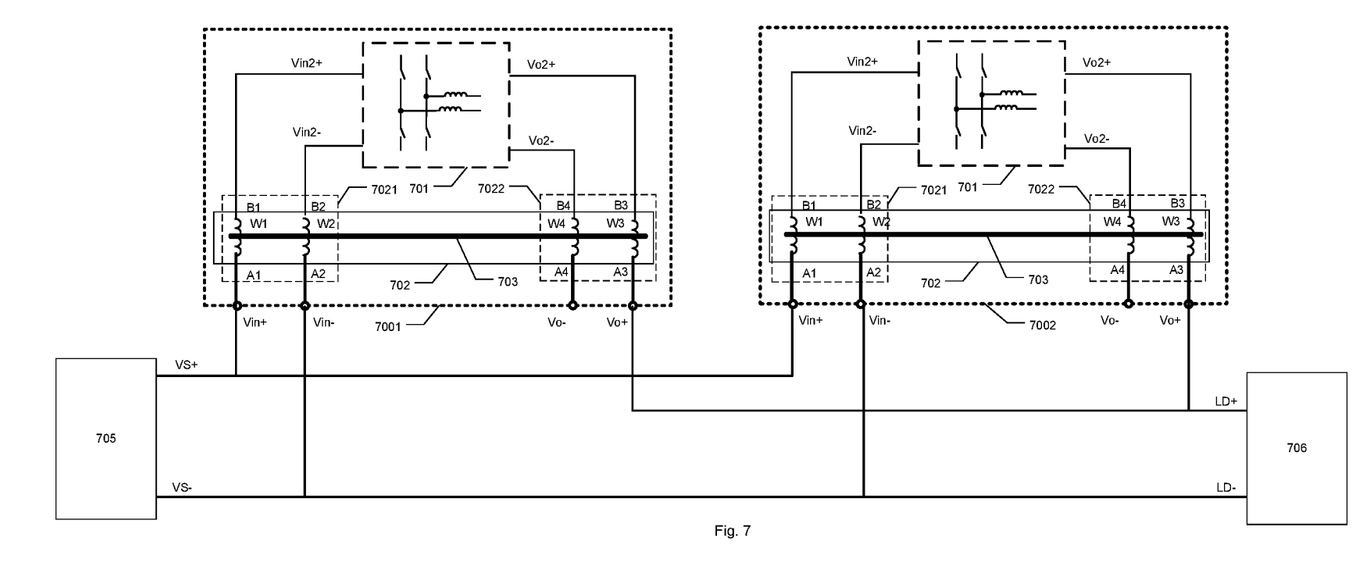
FIG. 7 is a schematic diagram of a circuit topology of a DC converter group having a filter module according to an embodiment of the present disclosure.

FIG. 7 illustrates a circuit topology of a DC converter group having a filter module according to an embodiment of the present disclosure. In this figure, for example, two DC converters 7001 and 7002 are connected in parallel. Those skilled in the art can conceive that the structure and mode of the parallel group may be applied to the case of more than two DC converters. The DC converter group includes the DC converters 7001 and 7002, a DC input unit 705 and a DC output unit 706. The DC converters 7001 and 7002 are the DC converter having a filter module as shown in FIG. 4, the DC input unit 705 is a power source or an energy storage unit such as a battery, and the DC output unit 706 is a load or energy storage unit. The DC input unit 705 is electrically coupled to an input end of each of the DC converters 7001 and 7002, and the DC output unit 706 is electrically coupled to an output end of each of the DC converters 7001 and 7002.

Specifically, a positive terminal VS+ of the DC input unit 705 is connected to the input positive terminal Vin+ of the DC converter 7001 and the input positive terminal Vin+ of the DC converter 7002 respectively; and a negative terminal VS− of the DC input unit 705 is connected to the negative terminal LD− of the DC output unit 706, and is connected to the input negative terminal Vin− of the DC converter 7001 and the input negative terminal Vin− of the DC converter 7002 respectively. At the output side of the DC converter, an output positive terminal Vo+ of the DC converter 7001 and an output positive terminal Vo+ of the DC converter 7002 are connected to the input positive terminal LD+ of the DC output unit 706 respectively. In this manner, the input inductor component 7021 (windings W1 and W2) and the output inductor component 7022 (windings W3 and W4) of each of the DC converters 7001 and 7002 are coupled by the common magnetic core, and perform the EMI filtering in directions from the DC input unit 705 and the DC output unit 706 to the DC conversion circuit 701, and the EMI filtering in directions from the DC conversion circuit 701 to the DC input unit 705 and the DC output unit 706.

The DC converter group having the filter module 702 not only maintains the electromagnetic interference suppression capability of the full-port filter module, but also avoids the negative current unbalance problem for the parallel DC converters, because, compared to the parallel mode of the DC converter of FIG. 2, the parallel mode of the DC converters of FIG. 7 makes the DC converter group do not have paralleled negative wirings distributed inside of each DC converter.

Figure 8:
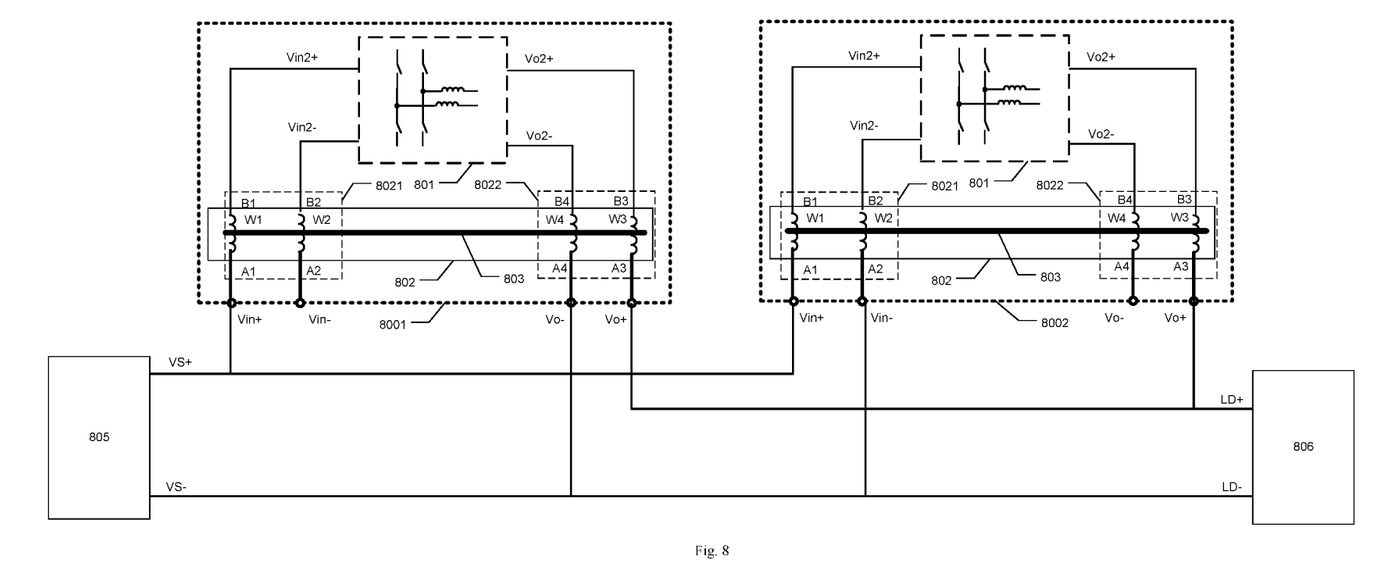
FIG. 8 is a schematic diagram of a circuit topology of a DC converter group having a filter module according to another embodiment of the present disclosure.

FIG. 8 illustrates a circuit topology of a DC converter group having a filter module according to another embodiment of the present disclosure. Different from FIG. 7, in the DC converter group of this embodiment, the negative terminal VS− of the DC input unit 805 and the negative terminal LD− of the DC output unit 806 are directly connected to each other, and are respectively connected to the output negative terminal Vo− of the DC converter 8001 and the input negative terminal Vin− of the DC converter 8002.

After the negative terminal VS− of the DC input unit 805 and the negative terminal LD− of the DC output unit 806 are directly connected, they may be connected to any one of the input negative terminal Vin− and the output negative terminal Vo− of the DC converter 8001, and any one of the input negative terminal Vin− and the output negative terminal Vo− of the DC converter 8002. For example, after the negative terminal VS− of the DC input unit 805 and the negative terminal LD− of the DC output unit 806 are directly connected, they may be connected to the output negative terminal Vo− of the DC converter 8001 and the output negative terminal Vo− of the DC converter 8002, or connected to the input negative terminal Vin− of the DC converter 8001 and the output negative terminal Vo− of the DC converter 8002.

Figure 9:
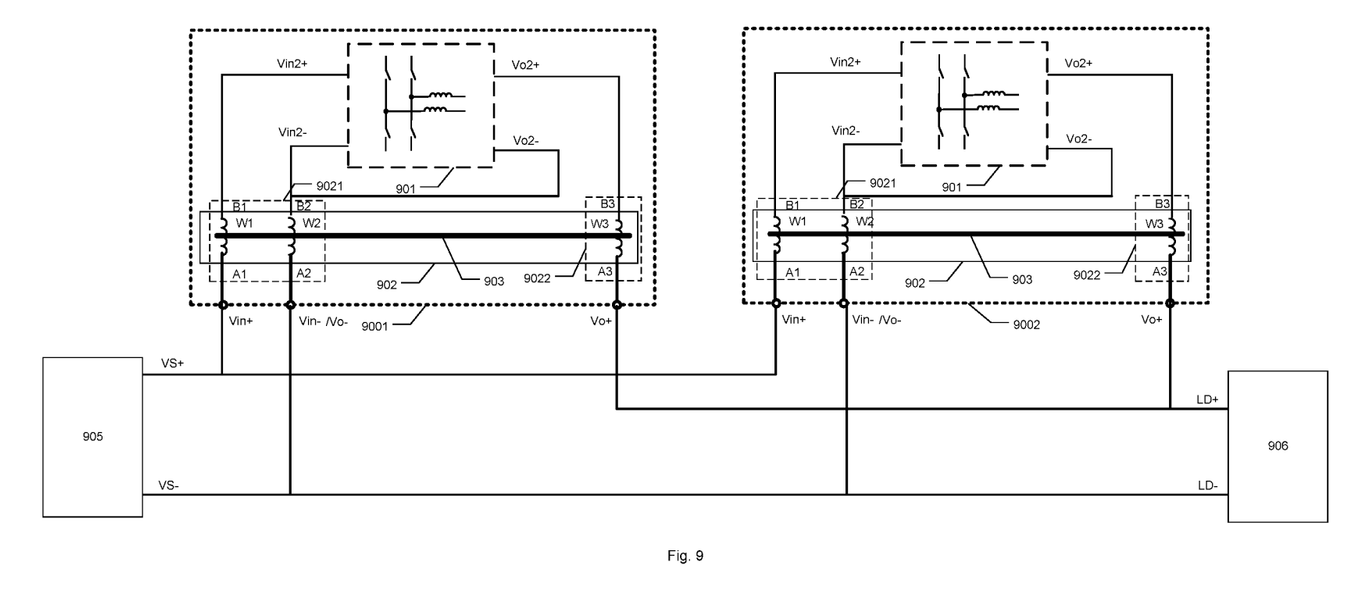
FIG. 9 is a schematic diagram of a circuit topology of a DC converter group having a filter module according to still another embodiment of the present disclosure.

In FIG. 9, a circuit topology of a DC converter group having a filter module according to still another embodiment of the present disclosure is shown. The DC converter in the DC converter group is the DC converter that has a common negative electrode terminal with respect to the outside as shown in FIG. 5. The input negative terminal Vin− and the output negative terminal Vo− of each of the DC converters 9001 and 9002 serve as the common negative electrode terminals with respect to the outside, and are connected to the negative terminal VS− of the DC input unit 905 and the negative terminal LD− of the DC output unit 906.

A method of connecting a DC converter group of the embodiment of the present disclosure will be described below.

Figure 10:
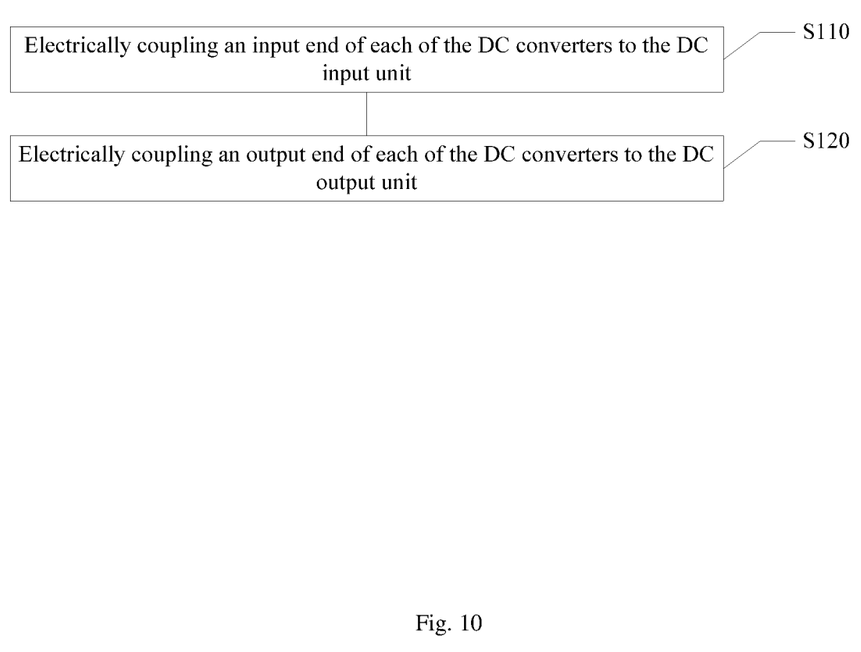
FIG. 10 is a method of connecting a DC converter group according to an embodiment of the present disclosure.

FIG. 10 illustrates a method of connecting a DC converter group according to an embodiment of the present disclosure, wherein the DC converter group includes the DC converters with the filter module shown in FIGS. 4-6. The connecting method includes steps of:

S110: electrically coupling an input end of each of the DC converters to the DC input unit; and S120: electrically coupling an output end of each of the DC converters to the DC output unit.

Figure 11:
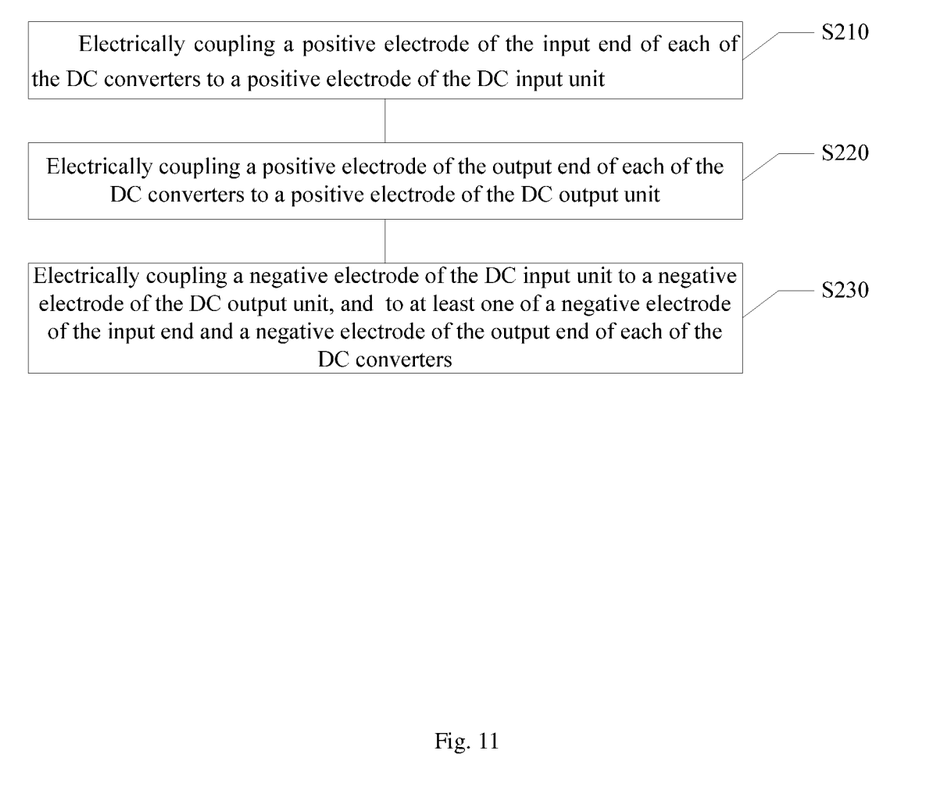
FIG. 11 is a method of connecting a DC converter group according to another embodiment of the present disclosure.

As shown in FIG. 11, according to another embodiment of the present disclosure, a method of connecting a plurality of DC converters further includes the following steps:

S210: electrically coupling a positive electrode of the input end of each of the DC converters to a positive electrode of the DC input unit;

S220: electrically coupling a positive electrode of the output end of each of the DC converters to a positive electrode of the DC output unit; and S230: electrically coupling a negative electrode of the DC input unit to a negative electrode of the DC output unit, and to at least one of a negative electrode of the input end and a negative electrode of the output end of each of the DC converters.

According to the DC converter, the DC converter group and the method of connecting the DC converter group according to the embodiments of the present disclosure, a filter module is used to realize EMI filtering for all or a plurality of input and output ports of the DC converter, which reduces the size of the DC converter, and saves the number and cost of components such as magnetic cores. Through this full-port filter module, it solves the problems of the DC and low frequency current offset and magnetic saturation of the common mode inductor, suffering differences between the positive and negative currents of respective input and output ports, caused by unbalanced currents or common negative electrodes of paralleled the DC converters. Further, by adding a detecting winding to the filter module, it not only realizes EMI filtering of all ports, but also realizes measurement of leakage current to ground of the DC converter.

In addition to the separate application of a DC converter with the full-port filter, a plurality of paralleled DC converters may further achieve EMI interference suppression between the DC converters and the external lines, which avoids the unbalance of the negative current of respective paralleled DC converters, and thus avoids the problem of local overcurrent or the negative current flowing through the halted DC converter.

The present disclosure has been described by the above-described related embodiments, but the above embodiments are merely examples for implementing the present disclosure. It must be noted that the disclosed embodiments do not limit the scope of the present disclosure. On the contrary, variations and modifications made without departing from the spirit and scope of the present disclosure all belong to the scope of the present disclosure.

What is claimed is:

1. A DC converter, comprising:
   an input end comprising a positive electrode and a negative electrode;
   an output end comprising a positive electrode and a negative electrode;
   a DC conversion circuit, converting a DC input voltage into a DC output voltage; and
   a filter module, electrically coupled to an input end and an output end of the DC conversion circuit, comprising:
      an input inductor component, electrically coupled to the input end of the DC conversion circuit; and
      an output inductor component, electrically coupled to the output end of the DC conversion circuit, wherein the input inductor component and the output inductor component share the same magnetic core, wherein the input inductor component comprises: a first winding electrically coupled between the positive electrode of the input end of the DC converter and a positive electrode of the input end of the DC conversion circuit, and a second winding electrically coupled between the negative electrode of the input end of the DC converter and a negative electrode of the input end of the DC conversion circuit; and the output inductor component comprises: a third winding electricity coupled between the positive electrode of the output end of the DC converter and a positive electrode of the output end of the DC conversion circuit, and a fourth winding electricity coupled between the negative electrode of the output end of the DC converter and a negative electrode of the output end of the DC conversion circuit.

2. A DC converter comprising:
an input end comprising a positive electrode and a negative electrode;
an output end comprising a positive electrode and a negative electrode;
a DC conversion circuit, converting a DC input voltage into a DC output voltage; and
a filter module, electrically coupled to an input end and an output end of the DC conversion circuit, comprising:
an input inductor component, electrically coupled to the input end of the DC conversion circuit; and
an output inductor component, electrically coupled to the output end of the DC conversion circuit, wherein the input inductor component and the output inductor component share the same magnetic core,
wherein the input inductor component comprises: a first winding electrically coupled between the positive electrode of the input end of the DC converter and a positive electrode of the input end of the DC conversion circuit, and a second winding electrically coupled between the negative electrode of the input end of the DC converter and a negative electrode of the input end of the DC conversion circuit; and the output inductor component comprises: a third winding electrically coupled between the positive electrode of the output end of the DC converter and a positive electrode of the output end of the DC conversion circuit, wherein a negative electrode of the output end of the DC conversion circuit is electrically coupled to the negative electrode of the input end of the DC conversion circuit, and the negative electrode of the input end of the DC converter is simultaneously used as the negative electrode of the output end of the DC converter.

3. The DC converter according to claim 1, wherein the DC converter further comprises a detecting component, configured to detect a leakage current from the DC conversion circuit between the input end and the output end of the DC conversion circuit to ground.

4. The DC converter according to claim 3, wherein the detecting component comprises a detecting winding, wound around the magnetic core.

5. The DC converter according to claim 1, wherein respective windings of the filter module are wound on the magnetic core in the same winding direction.

6. The DC converter according to claim 1, wherein the filter module further comprises at least one capacitor connected between the windings of the filter module.

7. The DC converter according to claim 1, wherein respective windings of the filter module have the same number of turns.

8. The DC converter according to claim 1, wherein the DC converter comprises at least two of the filter modules, and the input inductor component and the output inductor component of each of the filter modules are respectively connected in series with the input inductor component and the output inductor component of another one of the filter modules.

9. The DC converter according to claim 1, wherein the DC converter comprises at least two of the filter modules, and the first winding, the second winding, the third winding and the fourth winding of each of the filter modules are respectively connected in series with the first winding, the second winding, the third winding, and the fourth winding of another one of the filter modules.

10. The DC converter according to claim 2, wherein the DC converter comprises at least two of the filter modules, and the first winding, the second winding and the third winding of each of the filter modules are respectively connected in series with the first winding, the second winding and the third winding of another one of the filter modules.

11. A DC converter group, comprising:
DC converters according to claim 1;
a DC input unit, electrically coupled to the input end of each of the DC converters; and
a DC output unit, electrically coupled to the output end of each of the DC converters.

12. The DC converter group according to claim 11, wherein a positive electrode of the DC input unit is electrically coupled to the positive electrode of the input end of each of the DC converters, a positive electrode of the DC output unit is electrically coupled to the positive electrode of the output end of each of the DC converters, and a negative electrode of the DC output unit is electrically coupled to a negative electrode of the DC input unit, and electrically coupled to at least one of the negative electrode of the input end and the negative electrode of the output end of each of the DC converters.

13. The DC converter group according to claim 11, wherein the DC input unit is a power source or an energy storage unit.

14. The DC converter group according to claim 11, wherein the DC output unit is a load or an energy storage unit.

15. A method of connecting a DC converter group, for electrically coupling DC converters to a DC input unit and a DC output unit, wherein each of the DC converter comprises:
an input end comprising a positive electrode and a negative electrode;
an output end comprising a positive electrode and a negative electrode;
a DC conversion circuit, converting a DC input voltage into a DC output voltage; and
a filter module, electrically coupled to an input end and an output end of the DC conversion circuit, comprising:
an input inductor component, electrically coupled to the input end of the DC conversion circuit; and
an output inductor component, electrically coupled to the output end of the DC conversion circuit, wherein the input inductor component and the output inductor component share the same magnetic core,
wherein the input inductor component comprises: a first winding electrically coupled between the positive electrode of the input end of the DC converter and a positive electrode of the input end of the DC conversion circuit, and a second winding electrically coupled between the negative electrode of the input end of the DC converter and a negative electrode of the input end of the DC conversion circuit; and the output inductor component comprises: a third winding electrically coupled between the positive electrode of the output end of the DC converter and a positive electrode of the output end of the DC conversion circuit, and a fourth winding electrically coupled between the negative electrode of the output end of the DC converter and a negative electrode of the output end of the DC conversion circuit, and the method comprises:

electrically coupling the input end of each of the DC converters to the DC input unit; and electrically coupling the output end of each of the DC converters to the DC output unit.

16. The connecting method according to claim 15, comprising:

electrically coupling the positive electrode of the input end of each of the DC converters to a positive electrode of the DC input unit;

electrically coupling the positive electrode of the output end of each of the DC converters to a positive electrode of the DC output unit; and electrically coupling a negative electrode of the DC input unit to a negative electrode of the DC output unit, and to at least one of the negative electrode of the input end and the negative electrode of the output end of each of the DC converters.

17. The connecting method according to claim 15, wherein the DC input unit is a power source or an energy storage unit.

18. The connecting method according to claim 15, wherein the DC output unit is a load or an energy storage unit.

19. A DC converter group, comprising:

DC converters according to claim 2;

a DC input unit, electrically coupled to an input end of each of the DC converters; and a DC output unit, electrically coupled to an output end of each of the DC converters.

20. A method of connecting a DC converter group, for electrically coupling DC converters to a DC input unit and a DC output unit, wherein each of the DC converter comprises:

an input end comprising a positive electrode and a negative electrode;

an output end comprising a positive electrode and a negative electrode;

a DC conversion circuit, converting a DC input voltage into a DC output voltage; and a filter module, electrically coupled to an input end and an output end of the DC conversion circuit, comprising:

an input inductor component, electrically coupled to the input end of the DC conversion circuit; and an output inductor component, electrically coupled to the output end of the DC conversion circuit, wherein the input inductor component and the output inductor component share the same magnetic core, wherein the input inductor component comprises: a first winding electrically coupled between the positive electrode of the input end of the DC converter and a positive electrode of the input end of the DC conversion circuit, and a second winding electrically coupled between the negative electrode of the input end of the DC converter and a negative electrode of the input end of the DC conversion circuit; and the output inductor component comprises: a third winding electrically coupled between the positive electrode of the output end of the DC converter and a positive electrode of the output end of the DC conversion circuit, wherein a negative electrode of the output end of the DC conversion circuit is electrically coupled to the negative electrode of the input end of the DC conversion circuit, and the negative electrode of the input end of the DC converter is simultaneously used as the negative electrode of the output end of the DC converter, and the method comprises:

electrically coupling the input end of each of the DC converters to the DC input unit; and electrically coupling the output end of each of the DC converters to the DC output unit.

* * * * *